US009501877B2

(12) United States Patent
Andrus

(10) Patent No.: US 9,501,877 B2
(45) Date of Patent: Nov. 22, 2016

(54) INTELLIGENT TOWING PLUG

(71) Applicant: Prairie Innovators LLC, Turtle Lake, ND (US)

(72) Inventor: Paul Leonard Andrus, Turtle Lake, ND (US)

(73) Assignee: Prairie Innovators LLC, Turtle Lake, ND (US)

( * ) Notice: Subject to any disclaimer, the term of this patent is extended or adjusted under 35 U.S.C. 154(b) by 0 days.

(21) Appl. No.: 14/458,653

(22) Filed: Aug. 13, 2014

(65) Prior Publication Data

US 2016/0035156 A1 Feb. 4, 2016

Related U.S. Application Data

(60) Provisional application No. 61/865,192, filed on Aug. 13, 2013.

(51) Int. Cl.
| | |
|---|---|
| G07C 5/08 | (2006.01) |
| B60Q 1/30 | (2006.01) |
| G07C 5/00 | (2006.01) |
| B60Q 11/00 | (2006.01) |
| H01R 13/703 | (2006.01) |

(52) U.S. Cl.
CPC ............. G07C 5/0808 (2013.01); B60Q 1/305 (2013.01); B60Q 11/005 (2013.01); G07C 5/008 (2013.01); H01R 13/7038 (2013.01); H01R 2201/26 (2013.01)

(58) Field of Classification Search
CPC .... G07C 5/085; G07C 5/0808; H01R 12/722
USPC ................. 701/34, 31.5, 33.3, 33.5; 340/431
See application file for complete search history.

(56) References Cited

U.S. PATENT DOCUMENTS

| | | | | |
|---|---|---|---|---|
| 4,846,697 | A * | 7/1989 | Rodgers | 439/35 |
| 5,900,803 | A * | 5/1999 | Politz et al. | 340/425.5 |
| 6,154,035 | A * | 11/2000 | Aguirre | B60T 17/22 |
| | | | | 324/503 |
| 6,525,654 | B1 * | 2/2003 | Siggers | 340/438 |
| 7,339,465 | B1 * | 3/2008 | Cheng | B60Q 1/305 |
| | | | | 307/10.8 |
| 9,020,683 | B1 * | 4/2015 | Johnson | B62D 59/00 |
| | | | | 701/29.1 |
| 2008/0126788 | A1 * | 5/2008 | Kreek et al. | 713/100 |
| 2010/0152989 | A1 * | 6/2010 | Smith et al. | 701/78 |
| 2014/0015657 | A1 * | 1/2014 | Hanson et al. | 340/431 |

* cited by examiner

*Primary Examiner* — Tan Q Nguyen
(74) *Attorney, Agent, or Firm* — Schwegman Lundberg & Woessner, P.A.

(57) ABSTRACT

An intelligent towing plug apparatus and software system that performs trailer electrical system testing, diagnostic and monitoring routines as well as towing vehicle plug testing utilizing wireless technology housed completely inside a towing adapter plug or attached towing plug compartment housing that interfaces with any smart phone or towing vehicle on-board computer system that has downloaded or preinstalled the intelligent towing plug mobile application or software compatible with the on-board computer's operating system.

17 Claims, 9 Drawing Sheets

INTELLIGENT TOWING PLUG

RELATED U.S. APPLICATION DATA

The present application claims priority to U.S. Provisional Application No. 61/865,195, filed on Aug. 13, 2013.

BACKGROUND

For both consumer and commercial trailer use a safety check is required to ensure that the trailer systems, lights, brakes, etc., are working properly before the trailer is pulled onto a road and into traffic. Trailer and truck plug wiring is often exposed to harsh elements, road dirt and debris that can cause damage to the wires and failure of the electrical circuit needed to operate a particular trailer electrical system. The testing of the trailer system typically requires two people—one to manually engage the circuits from within the towing vehicle such as turning on the lights, turn signals or pressing the brake pedal, and one person to stand behind the trailer and observe whether the circuits are visibly working such as brake lights illuminating. Often when a circuit is found to be not working it takes considerable time, effort and expertise to determine if the problem is with the trailer system or the truck plug. There currently are products in the marketplace that can be attached to an idle trailer's plug and using an external battery source (not the towing vehicle) test the circuits of the trailer to determine any faults within the system. However, these test units are large, heavy and require a 12 volt battery or connection to a 110-120 volt electric power receptacle to provide the power needed to test the trailer system's circuits. Many of these systems also do not provide any diagnostic tools within the system nor are they capable of testing the towing vehicle's plug. These type of testing units are predominately used by truck/trailer rental yards. There are also products in the marketplace that can be installed onto the trailer body itself and then are wired to the trailer wire harness that is connected to the trailer plug. These type of units use the towing vehicle's 12 volt power supply to test the trailer systems. These systems can be wired or wireless such as U.S. Pat. No. 6,525,654 and they require that a separate display device be installed within the cab of the towing vehicle such as a truck/tractor so that the results of the testing and monitoring system can be viewed by the driver. These systems require installation and expertise by the user to correctly and properly wire the transmitter unit to the trailer wiring harness and install the receiver display unit inside the towing vehicle. This level of installation expertise is far beyond the knowledge and skills of the average towing vehicle user or owner. These type of systems are not portable or mobile to be easily and quickly installed and used with multiple towing vehicles and trailers. They also are not capable of testing the towing vehicle's trailer towing plug. It would be highly desirable to have a device that can test a system circuit on both the trailer and struck side of a plug. It would also be highly desirable to be able to monitor those systems in real time while the trailer is being towed so that any fault of any of the electrical circuits within the trailer system could be immediately known and safety precautions taken to ensure the safety of the passengers in the tow vehicle as well as those on the road in the vicinity of the trailer. There are no industry standards for this type of trailer system monitoring from within the towing vehicle nor are there systems provided by truck/tractor manufacturers as standard equipment to provide this type of trailer safety monitoring feature and functionality. There is a need for a simple, universal, inexpensive and highly portable and mobile testing and monitoring system that can be quickly plugged into industry standard plug types without any expertise and easily monitored with a highly available off-the-shelf hand held display unit that can easily fit in your pocket or be displayed in the cab of a towing vehicle. A highly desirable unit would be quickly and easily plugged and unplugged from one towing vehicle or trailer to another and automatically test the trailer systems and vehicle towing plug before using the trailer, diagnose any broken circuits or faults and then monitor the trailer systems in real time while the trailer is in use. An ideal 'plug and play' device would be compatible with industry standard 7-pin, 7-blade, 6-way round, 4-way round, 5-way flat and 4-way flat wiring adapter plugs without any customization of any kind making the product highly useful for both the consumer and commercial user. A highly desirable version of a device would also be compatible with the NATO military 12-pin plug.

SUMMARY

A preferred embodiment of the present invention is a trailer light, brake and electrical system testing, diagnostic and monitoring apparatus utilizing wireless technology housed completely inside an industry standard trailer adapter plug that bi-directionally interfaces with any electronic data processing device (EDP) such as but not limited to a smart phone, towing vehicle on-board computer or other computer that has downloaded or preinstalled an intelligent towing plug mobile application (mobile app) or software version compatible with vehicle on-board computer operating systems. The apparatus device also tests the towing vehicle's plug to determine if the vehicle plug is receiving circuit signals from the vehicle. A printed circuit board (PCB or PCBA) containing components such as microcontroller(s) (MCU), central processing unit (CPU), wireless module, memory, software and/or firmware as examples only is fully contained inside the trailer adapter plug or towing vehicle trailer towing plug (intelligent towing plug). When plugged into the towing vehicle's trailer towing plug AND the trailer's adapter plug, the PCB utilizes the power source from the towing vehicle to run testing, diagnostic and monitoring routines for the trailer system and a testing routine for the towing vehicle plug sending the resulting data via an industry standard wireless protocol to a smart phone or towing vehicle on-board computer that is running a mobile app or software designed to interface with the intelligent towing plug allowing the user to view the test data, diagnostic data and monitoring of the systems while the trailer is idle or in use. The system comprised of the intelligent towing plug device and mobile app also allows the user to initiate testing or diagnostic routines from the mobile app. System data such as circuit faults can also be heard as an audible warning so that the user is not visually distracted from safe driving while towing the trailer and using the intelligent towing plug system.

The intelligent towing plug is compatible will all industry standard truck and trailer adapter plugs including but not limited to consumer, commercial, industrial and military type plugs.

In another embodiment of the present invention the intelligent towing plug wireless data transmission is sent to the existing on-board computer system of the towing vehicle which has downloaded or preinstalled the intelligent towing plug mobile app or software version compatible with vehicle on-board computer operating systems and displays the testing, diagnostic and monitoring data on the factory built-in or after market display monitor. The on-board computer using the mobile app or compatible software sends software originated wireless signals to the intelligent towing plug PCB initiating and managing various testing, diagnostic and monitoring routines Another embodiment of the present invention is to place the intelligent towing plug PCB and its components inside the towing vehicle's trailer towing plug and eliminate the need for the adapter style intelligent towing plug that is placed in between the towing vehicle's trailer towing plug and the trailer's adapter plug. In this embodiment the intelligent towing plug could be installed as truck/tractor standard equipment or as an aftermarket truck/trailer accessory. In this embodiment the intelligent towing plug could also be hard wired via a communications BUS to the towing vehicle's on-board computer system and display monitor or utilize the wireless version to display system data to a smart phone or the towing vehicle's on-board computer system using industry standard wireless or proprietary protocols.

Yet another embodiment of the present invention is to place the PCB and its components inside the trailer adapter plug and eliminate the need for the adapter style intelligent towing plug that is placed in between the towing vehicle's towing adapter plug and the trailer adapter plug. In this embodiment the intelligent trailer plug could be installed as trailer standard equipment or as an after market trailer accessory. In this embodiment the intelligent towing plug can also transmit system data to a smart phone or the towing vehicle's on-board computer system using industry standard wireless protocols. The intelligent towing plug PCB also receives mode routine initiation and management wireless signals from the smart phone or on-board computer system using the intelligent towing plug mobile app. or compatible computer software.

Yet another embodiment of the present invention is to use cellular or mobile networks such as GSM, FDMA, CDMA or TDMA as examples only to connect the smart phone or on-board computer to an application server where the intelligent towing plug software resides and use the Internet to transmit and receive intelligent towing plug data. This network connection can be used in lieu of a wireless or wired connection between the smart phone or on-board computer and the intelligent towing plug PCB by adding a mobile chipset to the intelligent towing plug PCB. Or the smart phone or on-board computer can communicate with the intelligent towing plug PCB as described in the preferred embodiment via a wireless protocol or wired communication BUS to the on-board computer but access the intelligent towing plug software via an Internet connection to an application server using a mobile network instead of the mobile app or software residing on the smart phone or on-board computer.

In all embodiments of the wireless and wired version of the invention the mobile app or compatible software could be either downloaded or preinstalled onto a smart phone or an on-board computer system of the towing vehicle, be factory installed as standard equipment on the towing vehicle's computer system or the software could reside on an application server connecting to the smart phone or on-board computer via the Internet using a mobile network. The wireless module on the intelligent towing plug PCB is any industry standard wireless protocol including but not limited to Bluetooth, IEEE standards including but not limited to 802.11, WiFi, wireless USB and Radio Frequency (RF) or a proprietary protocol as examples only.

In all embodiments of the present invention the intelligent towing plug and mobile app or compatible software has a plurality of modes including but not limited to trailer test & diagnostic mode—tests and diagnoses the trailer circuit systems; trailer monitoring mode—monitors the trailer circuit systems while the trailer is being towed; battery mode—tests all the trailer circuit systems when the trailer is not hooked up to a towing vehicle; and towing vehicle plug test mode—tests the towing vehicle's trailer towing plug to see if there are circuit signals being received from the towing vehicle as examples only.

BRIEF DESCRIPTION

DETAILED DESCRIPTION

Figure 1:
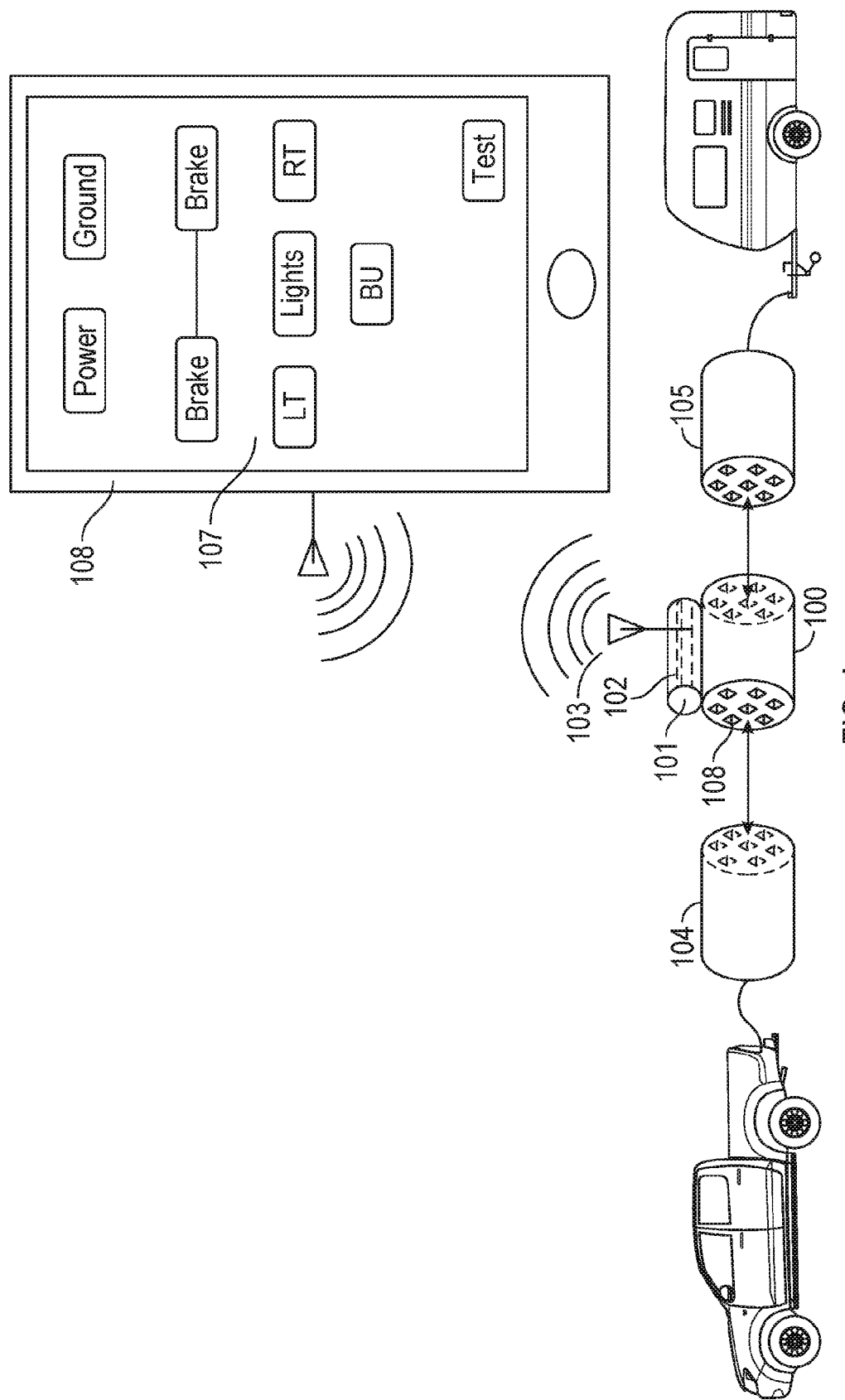
FIG. 1 shows an exemplary view of the preferred embodiment of the intelligent towing plug adapter device wirelessly transmitting trailer system electrical data via PCB housed inside the plug housing and receiving software initiated signals using a wireless protocol to and from a smart phone mobile software application.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 shows an exemplary view of the preferred embodiment of the intelligent towing plug adapter device wirelessly transmitting trailer system electrical data via PCB housed inside the plug housing and receiving software initiated signals using a wireless protocol to and from a smart phone mobile software application.

Figure 4:
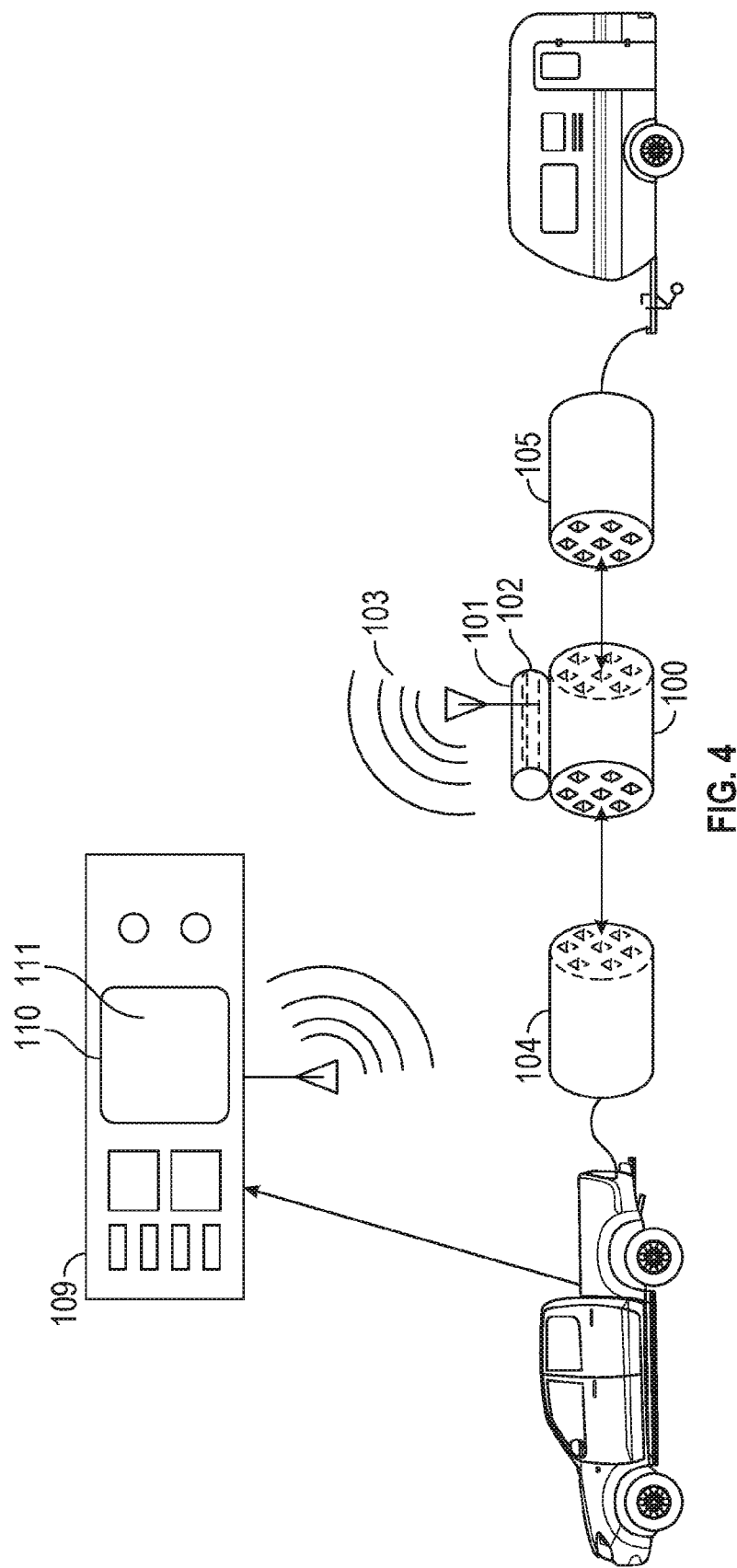
FIG. 4 shows an exemplary view of another embodiment of the intelligent towing plug adapter wirelessly transmitting trailer system electrical data and receiving software initiated signals using a wireless protocol to and from the towing vehicle's on-board computer system using intelligent towing plug software.

As shown in FIG. 1 the preferred embodiment of the intelligent towing plug adapter 100 is plugged into the towing vehicle's trailer towing plug 104 and the trailer adapter plug 105. In this exemplary view the plugs are industry standard 7-pin or 7-blade round plugs. There are a plurality of configurations that could be used to contain the wireless PCB 102 within the intelligent towing plug adapter 100 including a compartment housing 101 attached to the intelligent towing plug adapter 100. PCB 102 could also be contained inside the intelligent towing plug adapter 100. PCB 102 has a plurality of component configurations consisting of but not limited to an MCU (or multiple MCUs), CPU, SoC, IC, wireless module, memory, software and/or firmware as examples only. The wireless module component contains a transmission and receiving function 103 using an internal or external antenna and could use but not limited to a plurality of wireless protocol configurations including Bluetooth, RF (multi-channel radio frequency), IEEE standards such as but not limited to 802.11, WiFi, wireless USB or other industry standard wireless or proprietary wireless protocols supported by hand held devices, smart phones and on-board towing vehicle or other computer systems. Wireless transmission and receiving function is bi-directional between the intelligent towing plug PCB 102 and the smart phone 106 or on-board towing vehicle computer as shown in FIG. 4.

Figure 9:
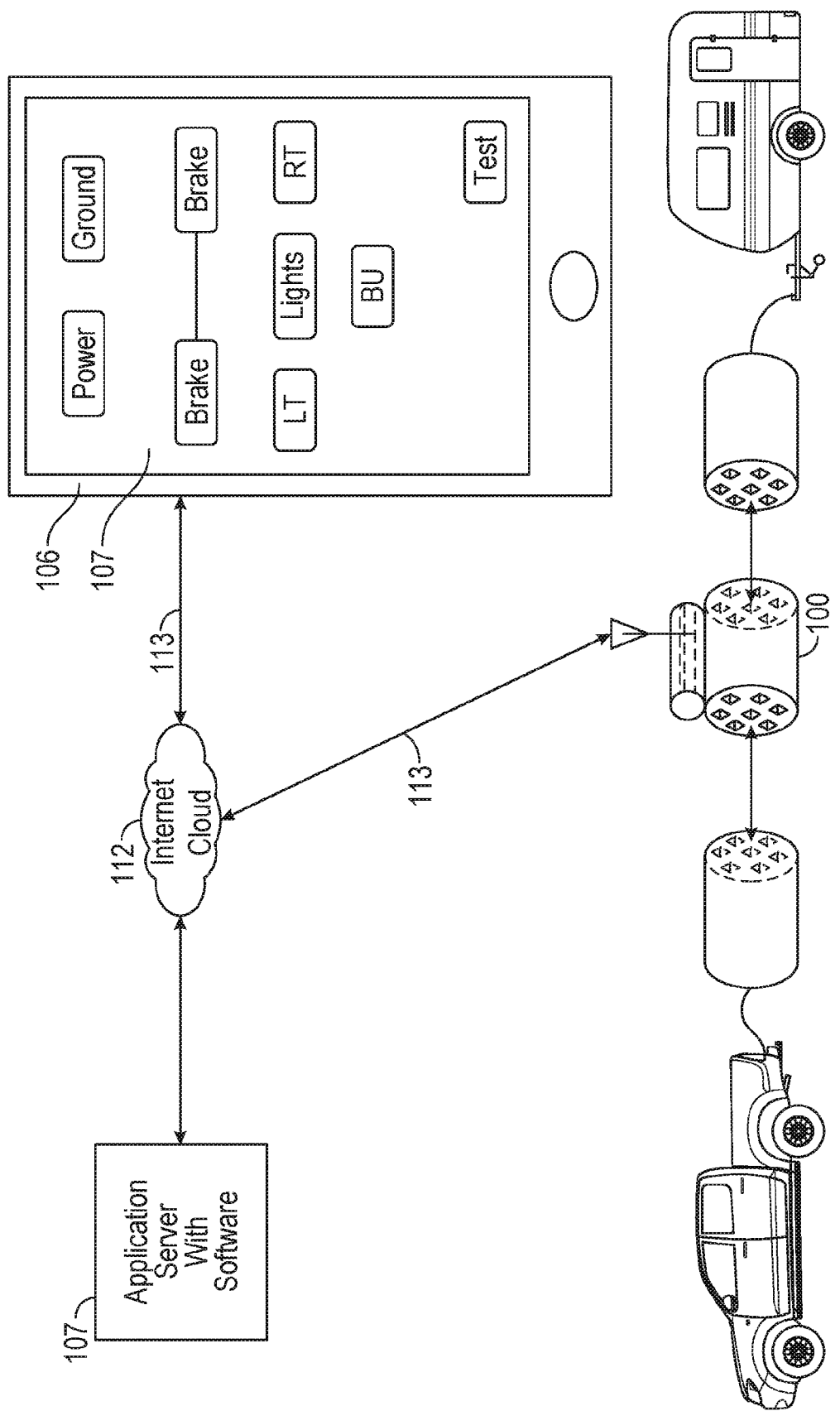
FIG. 9 shows an exemplary view of yet another embodiment of the present invention showing the software application residing on an application server instead of the smart phone connected by the Internet using a mobile network to send and receive trailer system electrical data transmitted using the Internet via a mobile network to and from the intelligent towing plug and smart phone.

PCB 102 could also contain a mobile chipset replacing the wireless module component for transmission and receiving function 103 over a mobile network as shown in FIG. 9.

In this preferred embodiment of the present invention the trailer electrical data wireless receiving EDP is a smart phone 106 that contains a mobile app 107 that displays the trailer system or towing vehicle plug data transmitted wirelessly by PCB 102 that is contained within the compartment housing 101 or the intelligent towing plug adapter 100. PCB 102 is connected to the plug pins or blades 108 inside the intelligent towing plug adapter 100. The smart phone 106 also sends wireless data transmissions to PCB 102 to initiate and manage trailer system testing, diagnostic and monitoring routines as well as towing vehicle trailer towing plug test routines using a mobile software application (mobile app).

Mobile app 107 is downloaded from the Internet to the smart phone 106 and provides a user interface that initiates routines and subroutines including but not limited to testing the trailer circuits, diagnosing circuit breaks and faults and monitoring the trailer systems including but not limited to lights, turn signals, brakes and other electronic circuits as well as displaying trailer electrical data on the smart phone screen. Test and monitoring routines enabled by PCB 102 inside intelligent towing plug adapter 100 receive power and circuit signals transmitted from the towing vehicle through the towing vehicle's trailer towing plug 104 and then send and manage those circuit signals to the trailer. Mobile app 107 can also be used to test and diagnose the trailer systems while the trailer is in use or stationary as well as test the towing vehicle's trailer towing plug.

FIG. 1 shows the intelligent trailer plug 100 in a form compatible with a 7-pin commercial or 7-blade consumer industry standard truck/trailer/RV plug. In other exemplary embodiments of the present invention other standard industry plug configurations are also used including but not limited to 6-way round, 4-way round, 5-way flat and 4-way flat wiring adapter plugs as well as NATO military 12-pin plugs.

Figure 5:
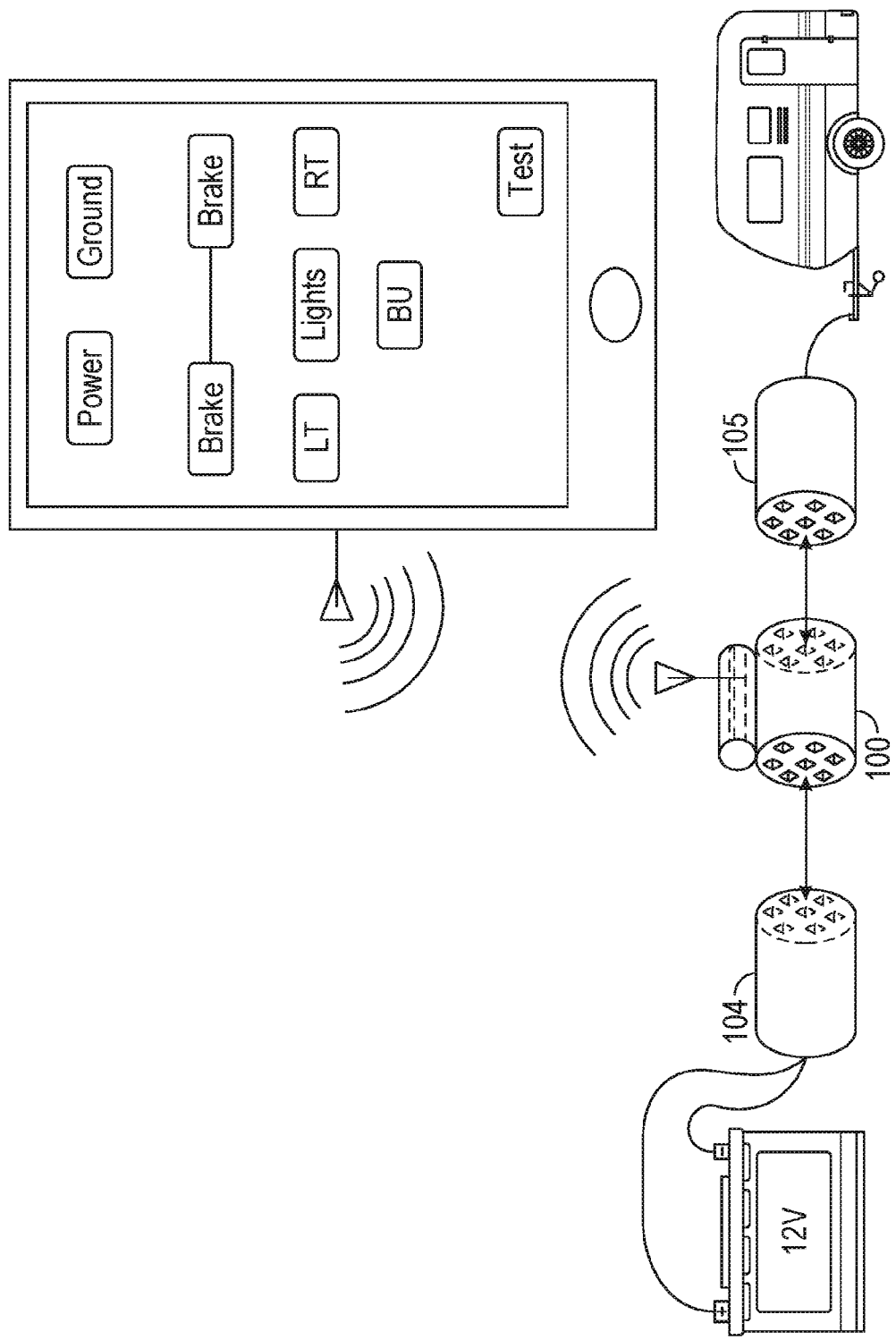
FIG. 5 shows an exemplary view of another embodiment of the present invention plugged into a 12 v battery to provide power for wirelessly transmitting trailer electrical system data and receiving software initiated signals using a wireless protocol to and from smart phone mobile software application when there is no towing vehicle to provide power.

In all embodiments of the present invention PCB 102 receives its power from the appropriate power pin in the towing vehicle's trailer towing plug 104 depending on what type of industry standard intelligent trailer plug or adapter is being used or directly from a battery as illustrated in FIG. 5.

Figure 2:
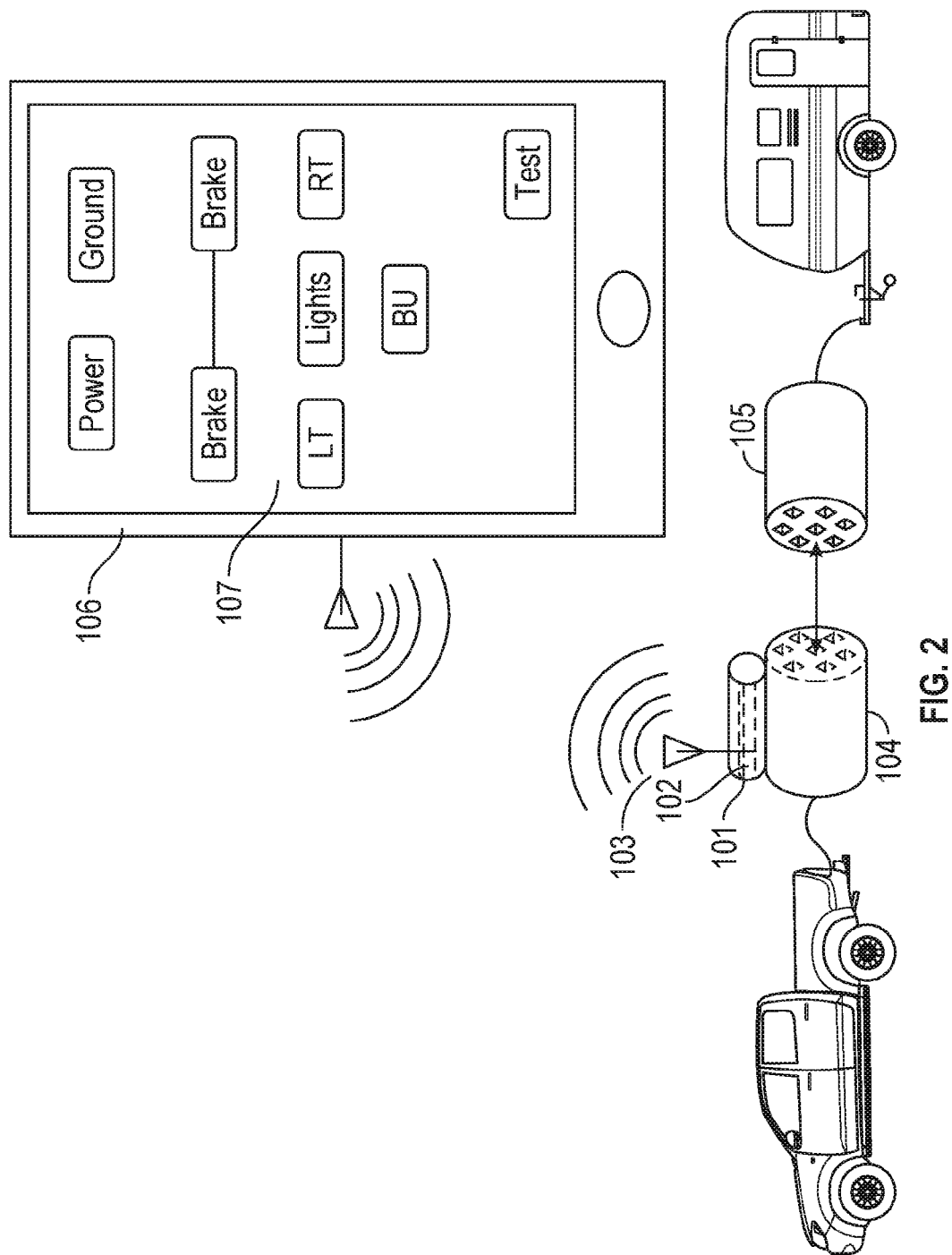
FIG. 2 shows an exemplary view of another embodiment of the present invention showing the PCB contained within the towing vehicle trailer towing plug wirelessly transmitting trailer system electrical data and receiving software initiated signals using a wireless protocol to and from a smart phone mobile software application.

FIG. 2 shows an exemplary view of another embodiment of the present invention showing the PCB contained within the towing vehicle trailer towing plug wirelessly transmitting trailer system electrical data and receiving software initiated signals using a wireless protocol to and from a smart phone mobile software application.

FIG. 2 is an exemplary view of PCB 102 placed inside the towing vehicle's trailer towing plug 104 or inside an attached housing compartment 101 and plugged into trailer adapter plug 105. As shown in FIG. 1 the preferred embodiment of the present invention PCB 102 contains a plurality of component configurations including a wireless module that contains a transmission and receiving function 103 sending trailer electrical system or towing vehicle plug data using one of a plurality of wireless protocols to smart phone 106 which contains a mobile app 107 that provides a user interface to initiate, display and manage trailer system testing, diagnosis and monitoring as well as towing vehicle trailer towing plug 104 test data routines to and from PCB 102.

In this exemplary embodiment of the present invention PCB 102 wireless module could transmit the trailer system or towing vehicle plug data to the towing vehicle's on-board computer system that contains mobile app 107 or a software version compatible with the on-board computer's operating system instead of a smart phone and receive software initiated data signals back from the on-board computer system using the same wireless protocol as shown in FIG. 4.

Figure 3:
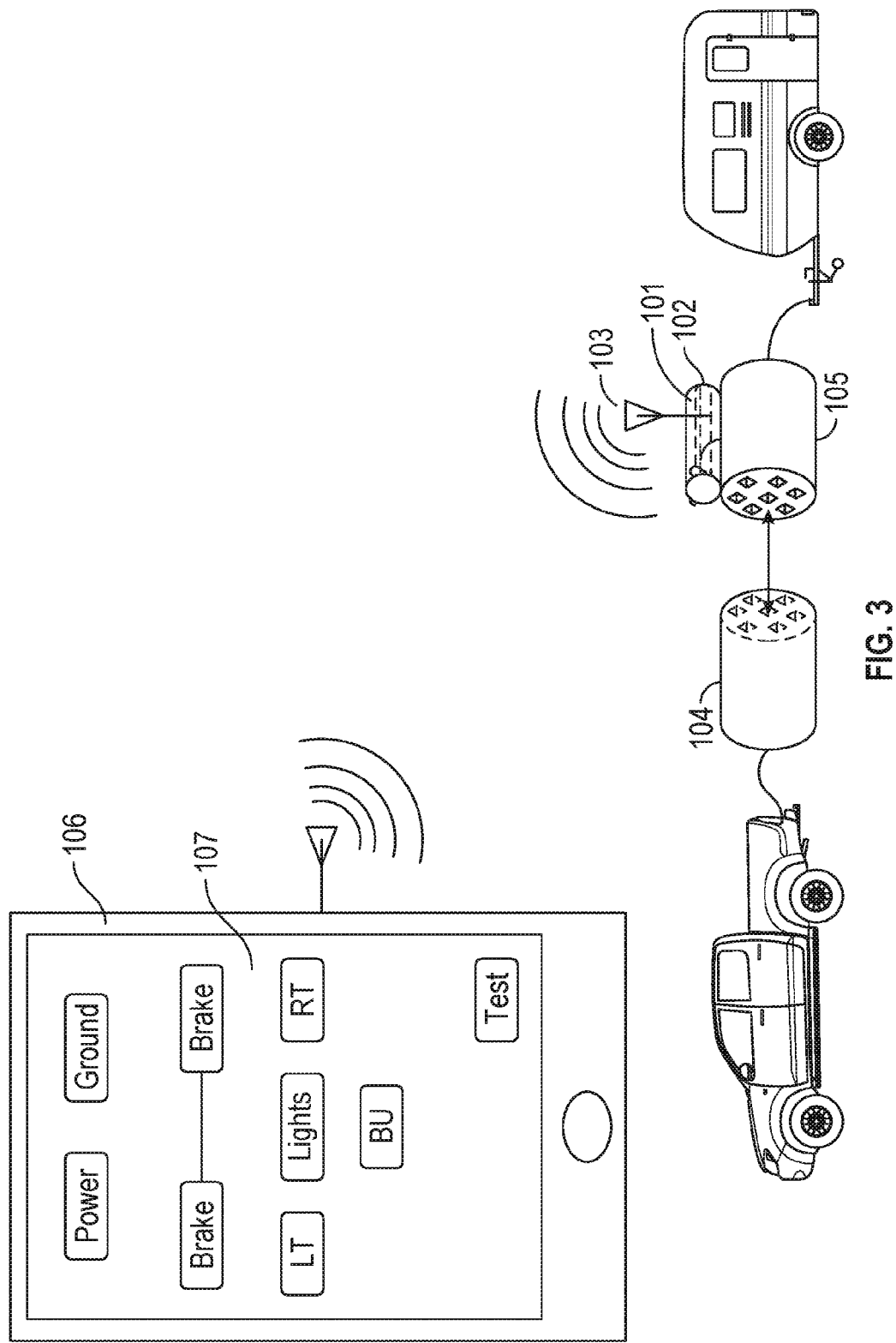
FIG. 3 shows an exemplary view of another embodiment of the present invention showing the PCB contained within the trailer adapter plug wirelessly transmitting trailer system electrical data and receiving software initiated signals using a wireless protocol to and from smart phone mobile software application.

FIG. 3 shows an exemplary view of another embodiment of the present invention showing the PCB contained within the trailer adapter plug wirelessly transmitting trailer system electrical data and receiving software initiated signals using a wireless protocol to and from smart phone mobile software application.

FIG. 3 is an exemplary view of PCB 102 placed inside trailer adapter plug 105 or inside an attached housing compartment 101 and plugged into towing vehicle's trailer towing plug 104. As shown in FIG. 1 the preferred embodiment of the present invention PCB 102 contains a plurality of component configurations including a wireless module that contains a transmission and receiving function 103 sending trailer electrical system or towing vehicle plug data using one of a plurality of wireless protocols to smart phone 106 which contains a mobile app 107 that provides a user interface to initiate, display and manage trailer system testing, diagnosis and monitoring as well as towing vehicle trailer towing plug 104 test data routines to and from PCB 102.

In this exemplary embodiment of the present invention PCB 102 wireless module could transmit the trailer system or towing vehicle plug data to the towing vehicle's on-board computer system that contains mobile app 107 or a software version compatible with the on-board computer's operating system instead of a smart phone and receive software initiated data signals back from the on-board computer system using the same wireless protocol as shown in FIG. 4.

FIG. 4 shows an exemplary view of another embodiment of the intelligent towing plug adapter wirelessly transmitting trailer system electrical data and receiving software initiated signals using a wireless protocol to and from the towing vehicle's on-board computer system using intelligent towing plug software.

FIG. 4 shows an exemplary embodiment of the present invention as described in FIG. 1 with transmission and receiving function 103 wirelessly sending the trailer system or towing vehicle plug data to a towing vehicle on-board computer system 110 and display monitor 111 contained within the towing vehicle's dash board 109 or in another area within the towing vehicle instead of a smart phone or in addition to a smart phone as described in FIG. 1. The towing vehicle on-board computer system 110 contains mobile app 107 as described in FIG. 1 or a software version compatible with the on-board computer's operating system. Software initiated signals from the towing vehicle on-board computer system 110 are sent back to PCB 102 to initiate and manage various intelligent towing plug routines and modes.

In other exemplary embodiments of the present invention described in FIGS. 2 and 3 transmission and receiving function 103 sends the trailer electrical system or towing vehicle plug data to a towing vehicle on-board computer system 110 and display monitor 111 contained within the towing vehicle's dash board 109 or another area within the towing vehicle. The on-board computer system contains mobile app 107 or a software version compatible with the on-board computer's operating system as described in FIG. 1. Software initiated signals from towing vehicle on-board computer system 110 are sent back to PCB 102 to initiate and manage various intelligent towing plug modes.

In another exemplary embodiment PCB 102 wireless module is replaced by a hard-wired communications bus connection from PCB 102 to the towing vehicle's on-board computer system that contains mobile app 107 or a software version compatible with the on-board computer's operating system.

FIG. 5 shows an exemplary view of another embodiment of the present invention plugged into a 12 v battery to provide power for wirelessly transmitting trailer electrical system data and receiving software initiated signals using a wireless protocol to and from smart phone mobile software application when there is no towing vehicle to provide power.

FIG. 5 shows an exemplary embodiment of the intelligent towing plug adapter 100 as described in FIG. 1 plugged into a towing vehicle trailer towing plug harness 104*a* and the trailer adapter plug 105. The towing vehicle trailer towing plug harness 104*a* is attached to a standard 12 volt vehicle or other similar battery or power source for testing and diagnosing trailer systems when a trailer is parked in a stationary state and there is no towing vehicle providing the power necessary to run the intelligent towing plug PCB as described in FIG. 1. Using a towing vehicle trailer towing plug harness 104*a* allows the user to test multiple trailers by moving the battery and the intelligent trailer plug 100 from trailer to trailer for testing and safety checks of multiple trailers in a trailer rental yard or fleet facility as examples without a towing vehicle. There is a plurality of uses for a mobile battery powered embodiment of the present invention consisting of an intelligent towing plug and mobile app.

The power source for this exemplary embodiment of the present invention could also be a 110-120 v electrical outlet source utilizing a power adapter.

Figure 6:
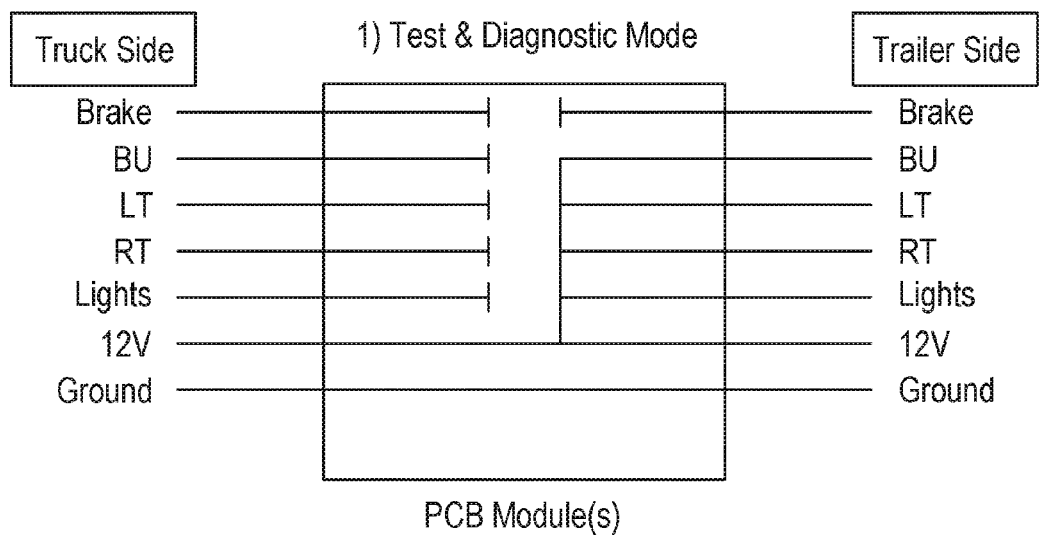
FIG. 6 shows an exemplary high level view of the circuit power management of a 7-pin or 7-blade plug in the test & diagnostic mode of the intelligent towing plug when the trailer is parked and idle and the monitor mode when the trailer is in use.
Figure 6:
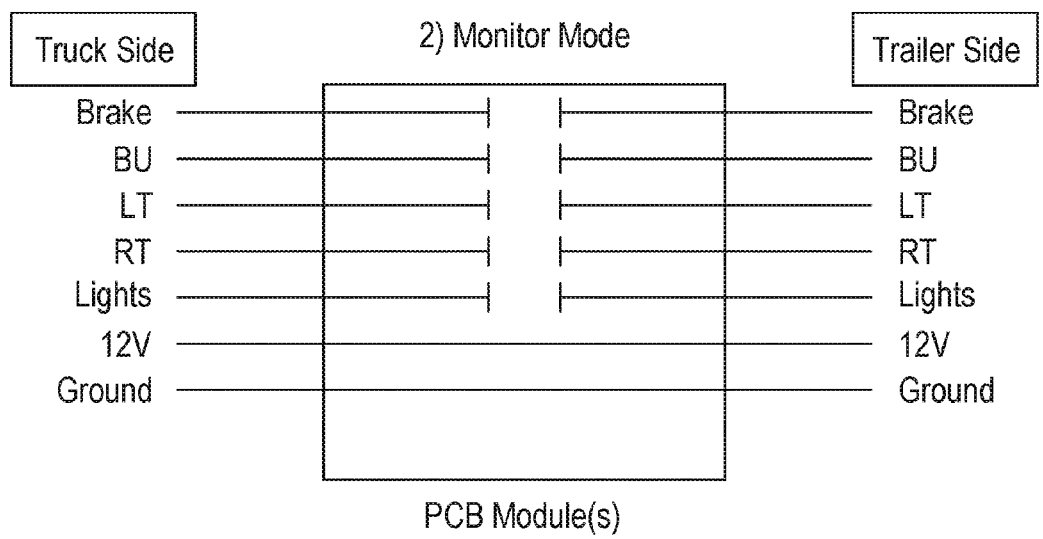

FIG. 6 shows an exemplary high level view of the circuit power management of a 7-pin or 7-blade plug in the test & diagnostic mode of the intelligent towing plug when the trailer is parked and idle and the monitor mode when the trailer is in use.

FIG. 6 is an exemplary high level power management chart of two of the functional routine modes of the preferred embodiment of the intelligent trailer plug in a commercial 7-pin or consumer 7-blade industry standard plug configuration when it is plugged into the towing vehicle's trailer towing plug and the trailer adapter plug. The mobile app initiates these mode sequence routines through the user interface of the intelligent towing plug mobile app or software version compatible with a computer's operating system which controls the intelligent towing plug's PCB components through the wireless module as described in FIG. 1 and FIG. 4 or a hard-wired communications BUS to the towing vehicle's on-board computer system as described in FIG. 4. Other routine modes include but are not limited to battery mode and towing vehicle plug test mode.

Figure 7:
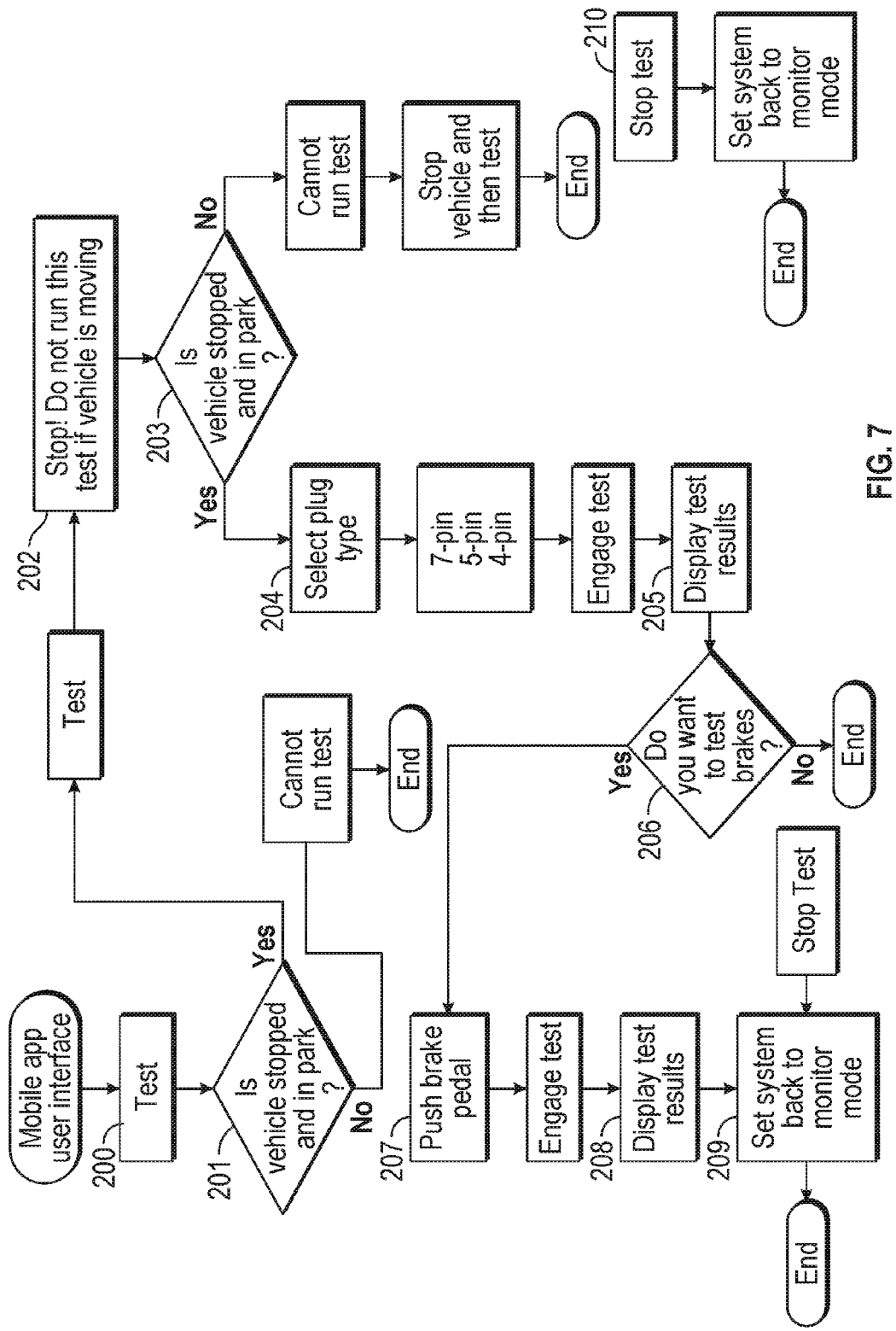
FIG. 7 shows an exemplary high level functional flow chart showing an intelligent towing plug trailer test routine initiated from a smart phone mobile software application or towing vehicle on-board computer system using intelligent towing plug software.

1) Trailer Test & Diagnostic Mode—Continuous power to all circuits but the brake circuit. In this example, the brake can only be tested when the brake pedal of the towing vehicle is engaged for safety reasons. (Insures the system does not automatically put the brake on while the vehicle is moving.) This test mode sequence can run in continuous serial mode testing each circuit one at a time or static mode testing all the circuits at the same time. The test mode cannot be run while the towing vehicle and trailer are moving unless the user indicates through a series of prompts in the mobile app user interface that the towing vehicle and trailer are stationary as shown in FIG. 7. This reduces the risk that the trailer lights are turned on and off during the test sequence routines while the trailer is moving and thereby creating a safety hazard for other driver's of other vehicles in the vicinity of the moving tow vehicle and trailer. Only in battery mode can the brake circuit be automatically tested when a trailer is not hooked up to a towing vehicle.

2) Trailer Monitor Mode—Power is provided to each circuit only when the driver of the towing vehicle engages the circuit, i.e. uses the turn signal, turns on the lights, pushes the brake pedal, etc. Whenever there is a broken circuit or fault, the PCB will send a signal to the mobile app or vehicle on-board computer system giving both a visual light indicator as to where the problem is as well as sound an audible alarm.

The mobile app or software version compatible with a computer's operating system can initiate a plurality of routines including a towing vehicle towing trailer plug test to display each circuit signal from the towing vehicle and indicate whether the signal is being received by the towing vehicle plug or not as well as internal plug electronic diagnostics to the trailer systems for locating over currents (short circuits) and low currents (open circuits) as examples only.

The default state of the plug is in trailer monitor mode. When the trailer test mode function is engaged the system is automatically reset back to monitor mode when the test is complete and the results are displayed on the screen of the smart phone or towing vehicle on-board computer monitor screen so that the vehicle lights do not come on while the vehicle is in motion which could be a safety hazard (turn signal or brake lights displaying while moving). This default monitor mode will also automatically turn off the continuous power mode (if this routine is engaged) to the trailer system after the test is complete so the towing vehicle's battery doesn't run down because the lights are continuously on when the trailer is not in use and the vehicle engine/alternator is not running to keep the vehicle's battery charged.

While in trailer monitor mode the system can be put into trailer test mode but only after the user acknowledges a series of warnings for safety reasons as illustrated in FIG. 7. And even then the brake circuit can only be engaged by pressing the brake pedal so that the system cannot automatically engage the brake while the towing vehicle and trailer are moving. Only in battery mode can the intelligent towing plug automatically test trailer brake circuits and systems.

FIG. 7 shows an exemplary high level functional flow chart showing an intelligent towing plug trailer test routine initiated from a smart phone mobile software application or towing vehicle on-board computer system using intelligent towing plug software.

FIG. 7 shows an exemplary flow chart of the trailer test mode routine initiated by the intelligent towing plug mobile app or software version compatible with a computer's operating system for the intelligent towing plug utilizing the intelligent towing plug PCB as described in FIG. 1. The default state of the intelligent towing plug is monitor mode as described in FIG. 6.

The user initiates the trailer test sequence routine by selecting the test button 200 on the mobile app. or software version compatible with a computer's operating system. A second screen 201 displays and queries the user as to the towing vehicle and trailer's state. By indicating the towing vehicle is stopped and in park then the system will begin the test sequence routine. If the user indicates the towing vehicle and trailer are not stopped then the test is not run and the routine ends.

If the test sequence routine is selected, a display warning 202 followed by a second query 203 requires the user to again confirm the towing vehicle and trailer are not moving. This step in the routine reduces the risk that the trailer lights are turned on and off during the test sequence routines while the trailer is moving and thereby creating a false light indicator and safety hazard for other driver's of other vehicles in the vicinity of the moving tow vehicle and trailer. If the user indicates that the tow vehicle and trailer are not stopped then the test cannot be run and ends. If the user answers YES then the test sequence begins by asking the user to select the standard plug type 204. Plug type 204 are examples only. In another version of the intelligent towing plug software or mobile app the intelligent towing plug will automatically identify the plug type by circuit and pin configuration so plug adapters can be easily used with the intelligent towing plug.

The test sequence routine is then started in continuous serial mode testing each circuit one at a time or static mode testing all the circuits at the same time (routine option button not shown). The results of the test 205 are displayed on the mobile app or on-board computer user interface. If circuit faults are displayed then the user will receive a separate diagnostic user interface and routine.

The next set of routines is the brake test initiated by the user through the user interface of the mobile app with a query 206 asking the user if they want to test the brakes. If the user indicates NO, the test sequence ends. If the user indicates YES, then the brake test routine begins by instructing the user to push the brake pedal 207. The brake circuit is tested and the results are displayed 208 on the user interface of the mobile app. After the test is complete the system is set back to monitor mode 209.

At any time during the test mode the user can stop the test sequence routine by selecting STOP TEST 210 which is always displayed on the mobile app user interface during testing mode routines.

This high level flow chart of the trailer test sequence routine of the intelligent towing plug is an example only of the sequences and routines initiated from the mobile app or software version compatible with a computer's operating system and performed by the PCB inside the intelligent towing plug or attached compartment housing as described in previous figures and embodiments of the present invention including FIG. 1. There is a plurality of variations and sub routines to the various modes of the preferred embodiment of the present invention including but not limited to trailer test and diagnostic mode, trailer monitor mode, battery mode and towing vehicle plug test mode as examples.

Figure 8:
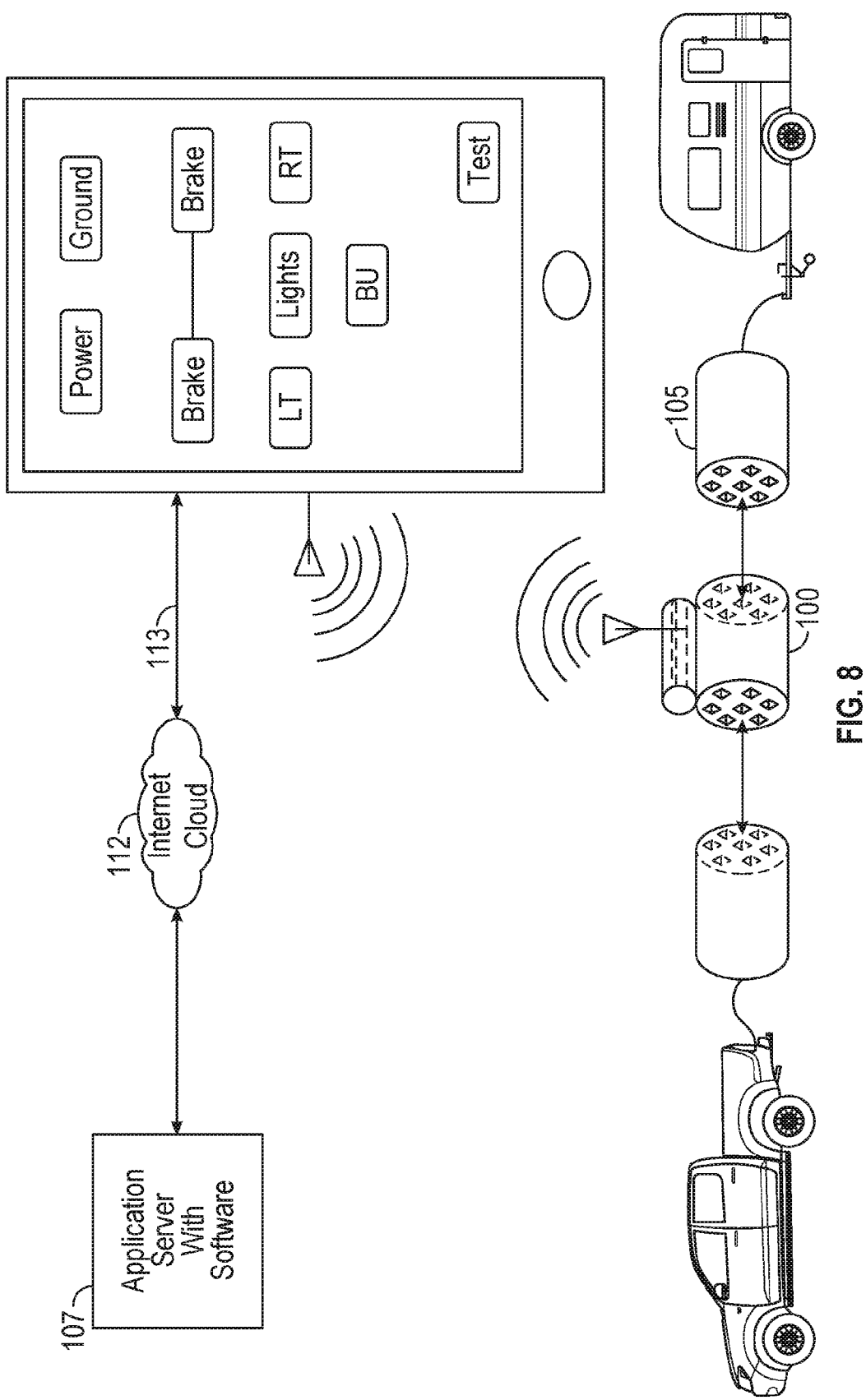
FIG. 8 shows an exemplary view of yet another embodiment of the present invention showing the software application residing on an application server instead of the smart phone connected by the Internet using a mobile network to send and receive wireless trailer system electrical data transmitted using a wireless protocol to and from a smart phone.

FIG. 8 shows an exemplary view of yet another embodiment of the present invention showing the software application residing on an application server instead of the smart phone connected by the Internet using a mobile network to send and receive wireless trailer electrical system data transmitted using a wireless protocol to and from a smart phone.

FIG. 8. shows an exemplary view of yet another embodiment of the present invention showing the mobile app or software application 107 residing on an application server instead of the smart phone 106 connected by the Internet 112 using a mobile network 113 to send and receive wireless trailer and towing vehicle system electrical data transmitted to and from the intelligent towing plug 100 PCB using a wireless protocol to and from a smart phone 106 as described in FIG. 1.

In this embodiment of the present invention the smart phone uses its mobile network 113 connectivity such as GSM, FDMA, CDMA or TDMA as examples only to connect to the Internet 112 where the IP address of an application server is found and the intelligent towing plug mobile app or software application 107 is accessed by a smart phone 106. As described in FIG. 1. the wireless module component in the intelligent towing plug 100 contains a transmission and receiving function using an internal or external antenna and could use a plurality of wireless protocol configurations to communicate the trailer and towing vehicle's towing plug electrical system data to a smart phone 106 or to the towing vehicle's on-board computer system as described in FIG. 4. The smart phone 106 receives and transmits data with the intelligent towing plug's mobile app or software application 107 over the Internet 112 using mobile network 113 connectivity to the smart phone 106.

FIG. 9 shows an exemplary view of yet another embodiment of the present invention showing the software application residing on an application server instead of the smart phone connected by the Internet using a mobile network to send and receive trailer system electrical data transmitted using the Internet via a mobile network to and from the intelligent towing plug PCB and smart phone.

FIG. 9. shows an exemplary view of yet another embodiment of the present invention showing the mobile app or software application 107 residing on an application server instead of the smart phone 106 connected by the Internet 112 using a mobile network 113 to send and receive trailer and towing vehicle electrical system data transmitted to and from intelligent towing plug 100 PCB using a mobile network 113 and the Internet 112.

In this embodiment of the present invention the smart phone and the intelligent towing plug 100 PCB uses mobile network 113 connectivity such as GSM, FDMA, CDMA or TDMA as examples only to connect to the Internet 112 where the IP address of an application server is found and the intelligent towing plug mobile app or software application 107 is accessed.

In yet another embodiment of this example of the present invention the towing vehicle on-board computer system as described in FIG. 4 could also use mobile network 113 connectivity such as GSM, FDMA, CDMA or TDMA as examples only to connect to the Internet 112 where the IP address of an application server is found and the intelligent towing plug mobile app or software application 107 is accessed. The smart phone 106 and/or towing vehicle on-board computer system receives and transmits data with the intelligent towing plug's mobile app or software application 107 over the Internet 112 using mobile network 113 connectivity to the smart phone 106 and/or towing vehicle on-board computer system as described in FIG. 4

In another exemplary embodiment intelligent towing plug 100 PCB is hard-wired via a communications bus connection from to the towing vehicle's on-board computer system as described in FIG. 4 and the towing vehicle's on-board computer system receives and transmits data with the intelligent towing plug's mobile app or software application 107 over the Internet 112 using mobile network 113 connectivity.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus that plugs into a towing vehicle plug and a trailer plug of a trailer, comprising:
    an outer housing;
    plug pins contained inside the outer housing configured to connect to an electrical circuit of the towing vehicle and an electrical circuit of the trailer;
    a printed circuit board (PCB) contained inside the outer housing, wherein the PCB is wired to the plug pins and configured to receive power from the towing vehicle towing plug;
    a processor and memory chip mounted on the PCB;
    software code stored in the memory chip, wherein the software code is configured to:
        determine that the trailer is in a stationary state,
        when the trailer is in the stationary state,
            execute a testing protocol of the electrical circuits of the trailer upon initiating the electrical circuit of the trailer,
            upon executing the testing protocol, terminate a monitoring protocol,
            terminate the testing protocol upon completion of the testing protocol,
            resume the monitoring protocol of the electrical circuits of the trailer upon termination of the testing protocol, and
            transmit, via a wireless module, a result of the testing protocol to an electronic data processing device (EDP), and
        when the trailer is not in the stationary state, transmitting a message to the EDP, the message indicating that the testing protocol cannot be performed; and
    the wireless module mounted on the PCB and configured to wirelessly transmit circuit data about the electrical circuits of the trailer to the EDP having a user interface for managing and displaying the circuit data, wherein the EDP includes one of the following: a mobile software application or software installed onto an onboard computer of the towing vehicle.

2. The apparatus according to claim 1, wherein the plug pins are plug blades.

3. The apparatus according to claim 1, wherein the monitoring protocol is configured to monitor the electrical circuits of the trailer while the trailer is in use.

4. The apparatus according to claim 1, wherein the testing protocol is configured to test the towing vehicle plug.

5. The apparatus according to claim 1, wherein the wireless module uses a standard wireless protocol.

6. The apparatus according to claim 1, wherein the wireless module is a mobile chipset using a standard mobile network.

7. The apparatus according to claim 1, wherein the outer housing includes a male portion that plugs directly into the towing vehicle plug and a female portion that plugs directly into the trailer plug, the outer housing being portable between the towing vehicle and the trailer.

8. The apparatus according to claim 1, wherein the EDP is one of the following: a smart phone; a computer that is capable of receiving and transmitting data using a standard mobile network with Internet connectivity.

9. The apparatus according to claim 1, wherein the PCB is coupled to a connector located in the outer housing configured to couple with a battery or an alternating current source.

10. A method performed by a device having a processor, the method comprising:
    determining that the towed vehicle is in a stationary state;
    when the towed vehicle is in the stationary state;
        initiating a testing protocol for testing of a trailer electrical circuit;
        upon initiating the testing protocol, terminating a monitoring protocol;
        terminating the testing protocol upon completion of the testing protocol;
        upon terminating the testing protocol, resuming the monitoring protocol, and
        transmitting, via a communication module in communication with the device, a result of the testing protocol to an external computing device or an onboard device of a towing vehicle; and when the towed vehicle is not in the stationary state, transmitting a message to the external device, the message indicating that the testing protocol cannot be performed.

11. The method according to claim 10, wherein the testing protocol includes a test of a towing plug electrical circuit of the towing vehicle.

12. The method according to claim 10, wherein the testing protocol includes conducting a test of a brake system circuit.

13. The method according to claim 10, further comprising initiating a visual or audible alarm when there is a circuit fault detected during the monitoring protocol or the testing protocol.

14. The method according to claim 10, wherein the testing protocol includes conducting a test of a lighting system circuit.

15. The method according to claim 10, wherein the testing protocol includes conducting a test of an auxiliary system circuit.

16. A system for testing an electrical circuit of a towed vehicle, the system comprising:
a housing mounted to a towing vehicle;
a communication module located within the housing;
a processor located within the housing and in electrical communication with the communication module; and
a memory that stores instructions that, when executed by the processor, cause the processor to perform operations comprising:
determining that the towed vehicle is in a stationary state,
when the towed vehicle is in the stationary state,
initiating a testing protocol for testing the electrical circuit of the towed vehicle,
upon initiating the testing protocol, terminating a monitoring protocol,
terminating the testing protocol,
upon terminating the testing protocol, resuming the monitoring protocol, and
transmitting, via the communication module, a result of the testing protocol to an external computing device, and
when the towed vehicle is not in the stationary state, transmitting a message to the external device, the message indicating that the testing protocol cannot be performed.

17. The system of claim 16, wherein the towed vehicle is a trailer.

* * * * *